United States Patent
Smith et al.

(10) Patent No.: US 8,616,475 B1
(45) Date of Patent: Dec. 31, 2013

(54) RECOVERY OF LITHIUM ION BATTERIES

(71) Applicant: Toxco, Inc., Anaheim, CA (US)

(72) Inventors: W. Novis Smith, Philadelphia, PA (US); Scott Swoffer, New Castle, DE (US)

(73) Assignee: Retriev Technologies Incorporated, Anaheim, CA (US)

( * ) Notice: Subject to any disclaimer, the term of this patent is extended or adjusted under 35 U.S.C. 154(b) by 0 days.

(21) Appl. No.: 13/920,529

(22) Filed: Jun. 18, 2013

(51) Int. Cl.
 *B02C 19/00* (2006.01)
 *B02C 21/00* (2006.01)

(52) U.S. Cl.
 USPC .............................. 241/21; 241/23; 241/30

(58) Field of Classification Search
 USPC .................... 241/21, 23, 24.1, 30
 See application file for complete search history.

(56) References Cited

U.S. PATENT DOCUMENTS

| | | | |
|---|---|---|---|
| 6,818,351 B2 | 11/2004 | Sunagawa et al. | |
| 6,872,491 B2 | 3/2005 | Kanai et al. | |
| 2005/0260495 A1 | 11/2005 | Onnerud et al. | |
| 2010/0230518 A1* | 9/2010 | Ewles et al. | 241/23 |
| 2011/0031336 A1* | 2/2011 | Stevens | 241/23 |
| 2012/0305684 A1* | 12/2012 | Bhandari et al. | 241/19 |

* cited by examiner

*Primary Examiner* — Faye Francis
(74) *Attorney, Agent, or Firm* — RatnerPrestia

(57) ABSTRACT

The present invention provides a process for recovery of copper, aluminum, carbon and cathode material from spent lithium ion batteries having lithium metal oxide cathode material. The cathode material which is recovered can be regenerated with lithium hydroxide and reused as cathode material.

9 Claims, 1 Drawing Sheet

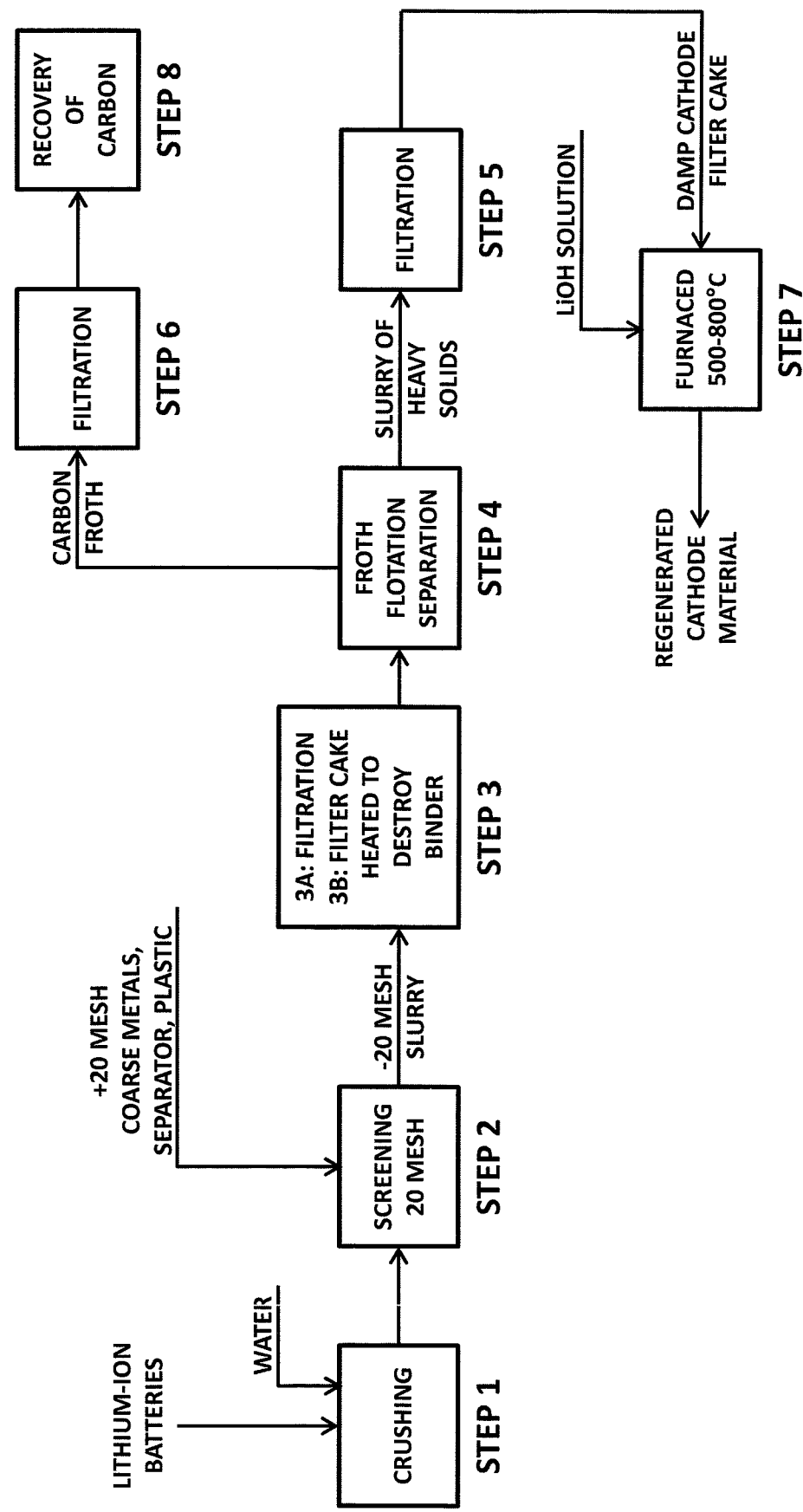

RECOVERY OF LITHIUM ION BATTERIES

FIELD OF THE INVENTION

The present invention relates to the recovery of components from spent lithium ion batteries and to the recycling of lithium cathode material obtained therefrom.

BACKGROUND OF THE INVENTION

The use of rechargeable lithium-ion batteries is growing steadily for many applications including its use in electric vehicles (EV) and Plug-in Hybrid Electric Vehicles (PHEV). The lithium-ion battery is also being used for energy storage for electrical grid networks and many other larger scale applications. It is already the dominate battery for cell phones, laptops, and mobile electronic applications. As these batteries reach end of life there is a need to provide a satisfactory recycle and disposal procedure for them. This is particularly acute for the large size prismatic batteries which are being made for many automotive and grid storage applications. These large format batteries and the cells of which they are made contain anodes which consist of carbon coated on copper foil and cathodes consisting of expensive lithium metal oxides such as lithium cobaltate, mixed lithium nickel/manganese oxides, lithium cobaltate/manganese/nickel oxides, lithium cobaltate/nickelate and related cathode materials on aluminum foil with a polymeric binder such as Kynar®. Currently, there are two recycle processes being used for lithium ion batteries: 1) These batteries are fed into electric furnaces already containing molten steel with the contained anode reducing carbons along with the separators and with flux to enrich the forming stainless steel alloy in cobalt, nickel and/or manganese. The lithium is fluxed into the slag and may be recovered at high cost with several extra processing steps (Umicor process); 2) The batteries are processed through a hammer mill and the screened −25 mesh slurry filtered and packaged. This slurry contains about 30% metals from the cathode along with the carbon. This metal rich mixture is shipped to an electric smelter for utilization in making steels. The copper and aluminum foils are separately recovered from the process.

Although the valuable cobalt and nickel is recovered along with the manganese for scrap metal prices, the full value of the lithium metal oxide cathode material is lost and usually with no recovery of the lithium metal oxide. It would be a major improvement in the recycling of strategic materials and would lower the cost of lithium batteries if the full value of the lithium metal oxide cathode material could be achieved by complete recovery and regeneration for direct reuse in a new lithium-ion battery. In addition, almost all of the lithium would also be recovered in the cathode material and remain as part of the lithium metal oxide cathode as it is regenerated and used in the new battery.

The recovery and reuse of the cathode material would lessen pressure on supply of lithium cathode materials such as nickel and cobalt.

U.S. Pat. No. 6,818,351 to Sernagawa et al. which is herein incorporated by reference in its entirety for all purposes, discloses the preparation of a cathode which can be used with the present invention. The cathode active components are a mixture of $LiCoO_2$ and spinel type lithium manganate.

U.S. Pat. No. 6,872,491 to Kanai et al., which is herein incorporated by reference in its entirety for all purposes, discloses the preparation of cathodes for lithium ion secondary batteries.

U.S. Patent Publication No. 2005/0260495A1 of Onnerud et al. discloses a composition having a formula $Li_xMgNiO_2$ wherein $0.9 < x < 1.3$ and $0.001 < y < 0.1$ which can be used as cathode material. The material is prepared by a method using a plurality of heat soaking temperatures.

U.S. Pat. No. 6,818,351 to Sernagawa et al. which is herein incorporated by reference discloses the preparation of lithium secondary battery cathodes with spinel type lithium manganese oxide and lithium containing cobalt oxide.

SUMMARY OF THE INVENTION

The present invention relates to the separation, recovery of metal components and lithium cathode material from spent lithium ion batteries. The invention further provides for the regeneration and use of the cathode material in the lithium ion battery cells for use in new lithium ion batteries.

In accordance with one embodiment of the invention, spent lithium ion batteries are treated in a process comprising the steps of:

1) Crushing the spent batteries under an aqueous (e.g., water) spray and optionally under an inert atmosphere to produce a slurry and to reduce the particle size of metal and plastic components to form a slurry mixture,
2) Screening the coarser solids from the slurry mixture of step 1) to recover the copper and aluminum present in the anode and cathode cells of the batteries and to remove the coarse metal casing and the separator plastic to form a screened slurry;
3) Filtering the screened slurry (e.g., <−25 mesh) to obtain a filter cake, drying the filter cake containing the cathode material and then heating the filter cake in an air or oxygen atmosphere to destroy the binder and modify the surface of the carbon from the anode and cathode;
4) Forming an aqueous slurry of the filter cake from step 3) and passing said aqueous slurry into a froth or foam flotation apparatus whereby the froth or foam contains residual light matter and the carbon and the dense cathode material sinks to the bottom, and then
5) Recovering the cathode material from the bottom of the froth or foam flotation apparatus.

Advantageously, the carbon is recovered from the froth or foam.

According to another embodiment of the invention the cathode material recovered in step 5) is treated with a solution of lithium hydroxide to make up for any stoichiometric lithium deficiency. This is generally about 0.2 to 3.0% by weight.

Advantageously, the cathode material is heated, mulled and screened to the particle size of >5 and <25 microns. The heating is from 400° C. to 850° C. This restores the cathode material to full direct use in lithium ion batteries.

It is a general object of the invention to recover the copper, aluminum and cathode material from spent lithium ion batteries.

It is a further object of the invention to regenerate the cathode material from spent lithium ion batteries for use in other lithium ion batteries.

It is yet another object of the invention to recover the copper and aluminum used in the anode and cathode cells of spent lithium ion batteries.

Other objects and advantages of the present invention will become apparent from a reading of the preferred embodiments and the drawing.

BRIEF DESCRIPTION OF THE DRAWING

FIG. 1 is a flow chart of an illustrative embodiment of the present process.

DESCRIPTION OF THE PREFERRED EMBODIMENTS

As seen in the Drawing, a process of the invention comprises step 1) which involves crushing or hammer-milling lithium ion batteries under an aqueous spray. The slurried mixture is then passed to step 2) wherein one or more mesh filters are used to remove any metal particles and plastic particles. The slurry from step 2) is filtered in step 3) and the filter cake is dried and heated to destroy the binder and modify the carbon. The treated filter cake is made into a slurry and passed into a froth or foam apparatus in step 4). The foam or froth which contains light material such as carbon is passed to step 6) and the heavier cathode material is filtered in step 5) to recover the cathode material. In step 7) the carbon in step 6) is then recovered.

According to the invention, lithium inn batteries may be treated in step 1) of the invention by passing them into a crushing apparatus or hammer-mill under a water spray to reduce the batteries into small pieces, dislodge any cathode and anode material and the copper and aluminum foils from the electrodes emerge as a coarse wet slurry component of the mixture which is passed onto a shaker or oscillating apparatus with at least one screen in step 2) to remove the coarse plastic components and coarser metal components.

The final screen, preferably being a +20 mesh (even -140 mesh) screen, allows only carbon and cathode material to pass. The slurry from step 2) is then treated in step 3) by filtering and then drying and heating the filter cake at 400-700° C. to destroy the binder and modify the carbon surface. A slurry is then formed with water and the slurry is passed into a froth or flotation apparatus in step 4) whereby the lighter weight carbon is floated off from the dense cathode material powder which sinks to the bottom.

The froth or foam can be formed using common anionic or non-ionic surfactants as additives wherein air is bubbled into the slurry. Commonly used are isobutyl carbinol and hydroxy propyl cellulose and kerosene. Froth or foam flotation is well known in the art.

The froth containing carbon particles can be floated off and filtered to collect the carbon. Optionally, the filtered residue is washed and then dried to recover the carbon.

The heavier slurry particles from the process are filtered and the residue washed with water and then dried. The recovered solids comprise the cathode material of the original battery and may have a purity of at least 85%.

The preferred steps of the process to recover cathode material which is present begins with the use of the following steps:
1) The spent batteries are reduced to small particles with a hammer mill under an aqueous spray to produce a slurry. (Optionally an inert atmosphere with an inert gas, for example nitrogen, can be used at this point.)
2) The slurry from 1) is screened through a mesh to remove any large metal particles and plastic material. Preferably a plurality of different coarse meshes are utilized to isolate different large sized particles which comprise copper and aluminum.

The cathode material which is recovered is the lithium metal oxides used in forming the cathode which include lithium mixed nickel/magnesium oxides, lithium cobaltate/manganese/nickel oxides, lithium cobalt nickel oxide, spinel type lithium manganese oxide, and the like.

According to another embodiment of the invention, the cathode material can be recharged by the addition of lithium hydroxide in amounts generally about 0.2 to 3.0% by weight so that the stoichiometric amount of lithium is present for full performance as a cathode material.

The foregoing description and the illustrative embodiments of the present invention have been described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

Example 1

Lithium-ion batteries containing lithium cobaltate as the cathode material were run through a hammer mill in plant production and screened through -25 mesh slot screen. The slurry was then filtered and the damp filter cake heated in a furnace to 500° C. for 1 hour with some air present to modify the carbon surface and destroy the binder and then cooled. The cake was approximately 35% Co.

The dried furnaced cake was wet screened through a US #140 mesh (106 micron) screen and then 100 g of this screened solid (on a dry basis) was made up to one liter volume with water (10% solids). This 10% slurry was then added to a Metso Denver D-12 Flotation unit with a one liter flotation cell. The slurry was stirred and a small amount of glacial acetic acid was added to adjust to pH 5 and then 1% kerosene and 0.5% methyl isobutyl carbinol were added as flotation and foaming aids. Air (or nitrogen) was slowly run through the stirring shaft with stirring to produce a stable foam. The air flow and stirring were adjusted to allow a steady slow foam to be maintained on the surface of the flotation cell which continuously washed or carried over the carbon floats. Additional water was added to maintain the liquid level in the flotation cell and to maintain the steady flow of foam. When the foam appeared to change from gray to white indicating no more carbon was coming over (about 30 minutes), the gas was discontinued and the slurry discharged to a filter to obtained the lithium cathode material. The weights of the sinks (cathode material) and floats (carbon) was 62 g in the sinks and 38 g in the floats.

The cathode material was analyzed for lithium content which was 5% and for cobalt content which was 50%. The theoretical analysis is about 7.0% lithium and about 60% cobalt. Sufficient lithium hydroxide solution was added and mixed into the cathode material to achieve the theoretical lithium level based on cobalt content (6%) the natural contained 12% conductive carbon (this is added during cathode slurry coating and is reusable in the cathode). This damp cake was heated while intermittently mixing under air to 735° C. for 2 hours and then cooled. The complete oxidation and removal of carbonate and water reduced the weight by 18%. The final cobalt analysis was 61% and the lithium was 7%, which is theoretical for lithium cobaltate. The final regenerated lithium cobaltate product was screened through -200 mesh, to provide a more uniform material for lithium-ion battery cell testing.

This material was dip-coated onto aluminum foil electrodes and inserted into a pouch cell with a carbon coated copper anode. The standard lithium ion battery electrolyte consisting of ⅓ ethylene carbonate, ⅓ dimethyl carbonate and ⅓ ethyl methyl carbonate containing 10% lithium hexafluorophosphate was added under nitrogen and the pouch vacuum sealed. The cells were formatted at C/8 up to 4.2 V and discharged down to 3.0 V and C/10 rate. The specific discharge capacity was 135 mAh/g. A similar cell with new lithium cobaltate had a discharge capacity of 138 mAh/g/.

Example 2

Lithium-ion batteries containing lithium nickel cobaltate ($LiCo_{0.5}Ni_{0.5}O_2$) as the cathode material were run through a hammer mill in plant production and screened through −25 mesh slot screen. The slurry was then filtered and the damp filter cake heated in a furnace to 500° C. for 1 hour with some air present to modify the carbon surface and destroy the binder and then cooled. The cake was approximately 17% Co and 17% Ni by weight.

The dried furnaced cake was wet screened through a US #140 mesh (106 micron) screen and then 100 g of this screened solid (on a dry basis) was made up to one liter volume with water (10% solids). This 10% slurry was then added to a Metso Denver D-12 Flotation unit with a one liter flotation cell. The slurry was stirred and a small amount of glacial acetic acid was added to adjust to pH 5 and then 1% kerosene and 0.5% methyl isobutyl carbinol were added as flotation and foaming aids. Air (or nitrogen) was slowly run through the stirring shaft with stirring to produce a stable foam. The air flow and stirring were adjusted to allow a steady slow foam to be maintained on the surface of the flotation cell which continuously washed or carried over the carbon floats. Additional water was added to maintain the liquid level in the flotation cell and to maintain the steady flow of foam. When the foam appeared to change from gray to white indicating no more carbon was coming over (about 30 minutes), the gas was discontinued and the slurry discharged to a filter to obtained the lithium cathode material. The weights of the sinks (cathode material) and floats (carbon) were 60 g in the sinks and 40 g in the floats.

The cathode material was analyzed for lithium content and found to be 4.5%. The cobalt was 30% and the nickel was 29% (Theoretical: 7.0% for lithium, 30% for cobalt, and 30% for nickel). Sufficient lithium hydroxide solution was added and mixed into the cathode material to achieve the theoretical lithium level based on the combined weights of cobalt and nickel present. This damp cake was heated while intermittently mixing under air to 735° C. for 2 hours and then cooled. The complete oxidation and removal of the carbon and water reduced the weight by 20%. The final cobalt analysis was 31% and the final nickel analysis was 30%. The lithium analysis was 7%, which is theoretical for $LiCo_{0.5}Ni_{0.5}O_2$. The final regenerated lithium nickel cobaltate product was screened through −200 mesh, to provide a more uniform material for lithium-ion battery cell testing.

This material was dip coated onto aluminum foil electrodes and inserted into a pouch cell with a carbon coated copper anode. The standard lithium ion battery electrolyte consisting of ⅓ ethylene carbonate, ⅓ dimethyl carbonate and ⅓ ethyl methyl carbonate containing 10% lithium hexafluorophosphate was added under nitrogen and the pouch vacuum sealed. The cells were formatted at C/8 up to 4.2 V and discharged down to 3.0 V and C/10 rate. The specific discharge capacity was 170 mAh/g.

Example 3

The lithium-ion batteries containing lithium nickel cobaltate ($LiCo_{0.33}Ni_{0.33}Mn_{0.33}O_2$) as the cathode material were run through a hammer mill in plant production and screened through −25 mesh slot screen. The slurry was then filtered and the damp filter cake heated in a furnace to 500 C. for 1 hour with some air present to modify the carbon surface and destroy the binder and then cooled. The cake was approximately 11% Co, 12% Mn, and 12% Ni by weight.

The dried furnaced cake was wet screened through a US #140 mesh (106 micron) screen and then 100 g of this screened solid (on a dry basis) was made up to one liter volume with water (10% solids). This 10% slurry was then added to a Metso Denver D-12 Flotation unit with a one liter flotation cell. The slurry was stirred and a small amount of glacial acetic acid was added to adjust to pH 5 and then 1% kerosene and 0.5% methyl isobutyl carbinol were added as flotation and foaming aids. Air (or nitrogen) was slowly run through the stirring shaft with stirring to produce a stable foam. The air flow and stirring were adjusted to allow a steady slow foam to be maintained on the surface of the flotation cell which continuously washed or carried over the carbon floats. Additional water was added to maintain the liquid level in the flotation cell and to maintain the steady flow of foam. When the foam appeared to change from gray to white indicating no more carbon was coming over (about 30 minutes). The gas was discontinued and the slurry discharged to a filter to obtained the lithium cathode material. The weights of the sinks (cathode material) and floats (carbon) were 60 g in the sinks and 40 g in the floats.

The cathode material was analyzed for lithium content and found to be 4.9% lithium, 18% cobalt, 18% manganese, and 18% nickel (theoretical analysis is 7.0% with 20% cobalt, 20% manganese, and 20% nickel). Sufficient lithium hydroxide solution was added and mixed into the cathode material to achieve the theoretical lithium level. This damp cake was heated while intermittent mixing under air to 725° C. for 2 hours and then cooled. The complete oxidation and removal of the carbon and water reduced the weight by 81%. The final analyses of the product were 20% cobalt, 20% manganese, and 20% nickel. The lithium was 7%, which is theoretical for $LiCo_{0.5}Ni_{0.5}O_2$. The final regenerated lithium nickel manganese cobaltate product was screened through −200 mesh to provide a more uniform material for lithium-ion battery cell testing.

This material was dip coated onto aluminum foil electrodes and inserted into a pouch cell with a carbon coated copper anode. The standard lithium ion battery electrolyte consisting of ⅓ ethylene carbonate, ⅓ dimethyl carbonate and ⅓ ethyl methyl carbonate containing 10% lithium hexafluorophosphate was added under nitrogen and the pouch vacuum sealed. The cells were formatted at C/8 up to 4.2 V and discharged down to 3.0 V and C/10 rate. The specific discharge capacity was 175 mAh/g.

What is claimed is:
1. A process for the reclaiming of copper, aluminum, carbon and cathode material from spent lithium ion batteries having a lithium metal oxide cathode material which comprises the steps of;
   a) crushing spent lithium ion batteries under an aqueous spray to form a slurry mixture;
   b) screening the slurry mixture through at least one mesh filter to recover the coarser pieces of aluminum and copper to form a screened slurry containing solids;
   c) recovering the solids from the screened slurry by filtration to obtain a filter cake;
   d) drying the filter cake from step c) to obtain a dried cake and heating the dried cake at a temperature of 400-800° C. to obtain a heated dried filter cake;

e) forming an aqueous slurry of the heated dried filter cake from step d) and passing the aqueous slurry into a froth or flotation apparatus to generate a froth or foam containing carbon;

f) filtering the froth or foam from step e) to recover carbon, and g) recovering a cathode material from the bottom of said froth or flotation apparatus of step e).

2. The process of claim 1 wherein the heated dried filter cake is milled.

3. The process of claim 1 wherein the cathode material comprises lithium cobaltate.

4. The process of claim 1 wherein the crushing of spent lithium ion batteries is under an inert atmosphere.

5. The process of claim 1 wherein the spent lithium ion batteries are crushed by hammer milling.

6. The process of claim 1 wherein the slurry mixture is screened through a +20 mesh filter in step b).

7. The process of claim 1 wherein in step d) any binder is destroyed upon heating.

8. The process of claim 1 which comprises adding lithium hydroxide to the cathode material recovered in step g) and heating to 400-850° C.

9. The process of claim 8 wherein the lithium hydroxide is added to the cathode material to obtain a stoichiometric amount of lithium in the cathode material and heated from 400 to 850° C.

\* \* \* \* \*

UNITED STATES PATENT AND TRADEMARK OFFICE
CERTIFICATE OF CORRECTION

| | | |
|---|---|---|
| PATENT NO. | : 8,616,475 B1 | Page 1 of 1 |
| APPLICATION NO. | : 13/920529 | |
| DATED | : December 31, 2013 | |
| INVENTOR(S) | : W. Novis Smith et al. | |

It is certified that error appears in the above-identified patent and that said Letters Patent is hereby corrected as shown below:

In The Specification

At column 1, lines 2-3 after the title, please add the following new heading and paragraph:

--STATEMENT REGARDING FEDERAL FUNDING

This invention was made with government support under Contract No. DE-EE0002610 awarded by the Department of Energy. The government has certain rights in the invention.--

Signed and Sealed this
Nineteenth Day of April, 2016

Michelle K. Lee
*Director of the United States Patent and Trademark Office*